Oct. 31, 1967 K. KLEINE-WEISCHEDE 3,350,533
CHAIN WELDING MACHINE

Filed Jan. 25, 1965 3 Sheets-Sheet 1

INVENTOR
Karl Kleine-Weischede
BY
Richards & Geier
ATTORNEYS

Oct. 31, 1967 K. KLEINE-WEISCHEDE 3,350,533
CHAIN WELDING MACHINE
Filed Jan. 25, 1965
3 Sheets-Sheet 3

INVENTOR
Karl Kleine-Weischede
BY
Richards & Geier
ATTORNEYS

United States Patent Office 3,350,533
Patented Oct. 31, 1967

3,350,533
CHAIN WELDING MACHINE
Karl Kleine-Weischede, Hauptstr. 40, Gersweiler,
near Saarbrucken, Germany
Filed Jan. 25, 1965, Ser. No. 427,682
Claims priority, application Germany, Jan. 25, 1964,
M 59,666
1 Claim. (Cl. 219—51)

This invention relates to a chain welding machine with resistance butt welding and refers more particularly to a machine wherein in the course of each operational period the ends of a bent C-shaped steel chain element, which are to be welded together, are initially pressed together with lesser pressure, which is the so-called positioning pressure, whereupon the ends are brought to the welding temperature and then are welded together in a blow-like manner at higher pressure, namely, the so-called upsetting pressure.

Chain welding machines of this type which are known in prior art, are provided with two-armed levers which swing against each other in the same plane and which hold the steel elements, whereby the long arms of the levers are held spread out by toggle joint pieces engaged by tensioned springs, so that the steel elements held by the short arms of the levers can be moved relatively to each other. The levers and the toggle joint pieces are moved to an initial position by a welding lever which is actuated by a rotating cam; the same operation brings the springs producing the positioning pressure, as well as separate springs producing the upsetting pressure, into their tensioned state. When the operating cam releases the welding lever, firstly one set of springs operates through the toggle joint pieces upon the upsetting levers to exert the positioning pressure, while springs producing the upsetting pressure are held by a lock device in their tensioned positions.

When the ends of the chain element which have been pressed together with the positioning pressure, have reached the welding temperature, the lock of the tensioned springs producing the upsetting pressure is released by a device responsive to light or heat radiation at the welding location, a timing relay or the like, as well as a magnet, so that the dies upset the heated chain element ends in a blow-like manner. The welding current can be switched off at the same time.

Experience has shown that these known automatic welding machines are not satisfactory in so far as the requirements for the precision of the set pressures and duration, the speed of operational periods and age expectancy are concerned, particularly with respect to the lock device, and particularly when chain elements consisting of steels of more expensive and better types are to be welded.

Furthermore, in prior art welding machines it is quite difficult to set the positioning pressure and the upsetting pressure independently of each other in accordance with the prevailing requirements.

An object of the present invention is to eliminate these drawbacks of prior art machines.

Another object is the provision of a chain welding machine for resistance butt welding which is particularly simple in construction and effective in operation, and which can be used for effectively welding chain elements consisting of steels of better categories.

Other objects of the present invention will become apparent in the course of the following specification.

In the accomplishment of the objectives of the present invention it was found desirable to provide a hydraulic pressure cylinder operating against the source of the upsetting force, whereby a maximum pressure regulator maintains the pressure of the cylinder at a maximum to produce an opposed piston force; then through the opening of a closing device the pressure is suddenly reduced, so as to produce a full upsetting pressure at the chain element.

The construction of the chain welding machine in accordance with the present invention has the advantage that only one source of power, for example, one or several tensioned springs, is required for the positioning pressure as well as for the upsetting pressure; when the upsetting pressure is introduced, there are no parts which hit each other like hammers, while this was always the case in prior art chain welding machines.

In accordance with the present invention the positioning pressure upon the chain element to be welded, is composed of the upsetting force exerted by the power source, reduced by the counter force exerted by the hydraulic pressure cylinder. This counter force can be maintained constant by a maximum pressure regulator or a maximum pressure valve. In order to release the upsetting pressure at the right time it is merely necessary to open a closing element combined with the pressure cylinder, so that pressure in the pressure cylinder suddenly drops to atmospheric pressure and the full upsetting force becomes available for use.

Preferably, means are provided for setting the highest pressure at the maximum pressure regulator. This makes it possible to vary the positioning pressure while the upsetting pressure remains the same, or to adjust the positioning pressure independently of the upsetting pressure.

Pipes extending from the pressure chamber of the pressure cylinder and through the maximum pressure regulator and the closing means end advantageously in a container located at a level which is higher than the other parts of the hydraulic apparatus. This arrangement has the advantage that even in the event of a leakage the piston of the pressure cylinder will provide full suction in the pressure chamber.

A preferred embodiment of the present invention pertains to an automatic welding machine for the quick pressure butt welding of chain elements of particularly hard steel of high quality, comprising a welding lever which is known per se, which is swingably mounted, which is actuated by a rotary cam and which can be moved into a tensioned position. This welding lever moves the upsetting dies through the medium of the toggle joints and the upsetting levers and is engaged by springs the force of which can be adjusted and which produce the upsetting force, as well as by a hydraulic pressure cylinder operating against the spring force.

The invention will appear more clearly from the following detailed description when taken in connection with the accompanying drawings showing by way of example, a preferred embodiment of the inventive idea.

Figure 1:
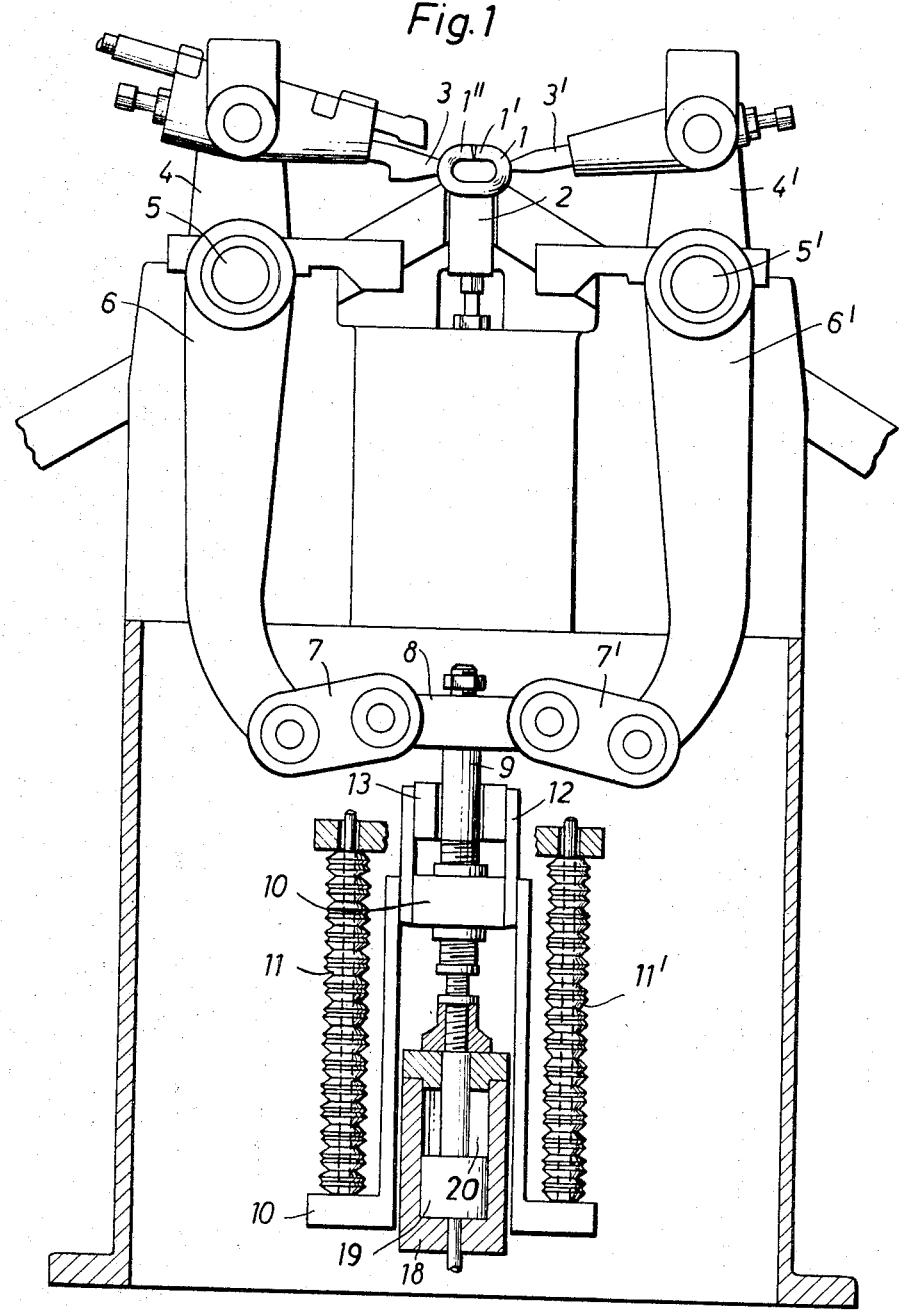
FIGURE 1 is a front view, partly in section, of a portion of a machine constructed in accordance with the principles of the present invention.
Figure 2:
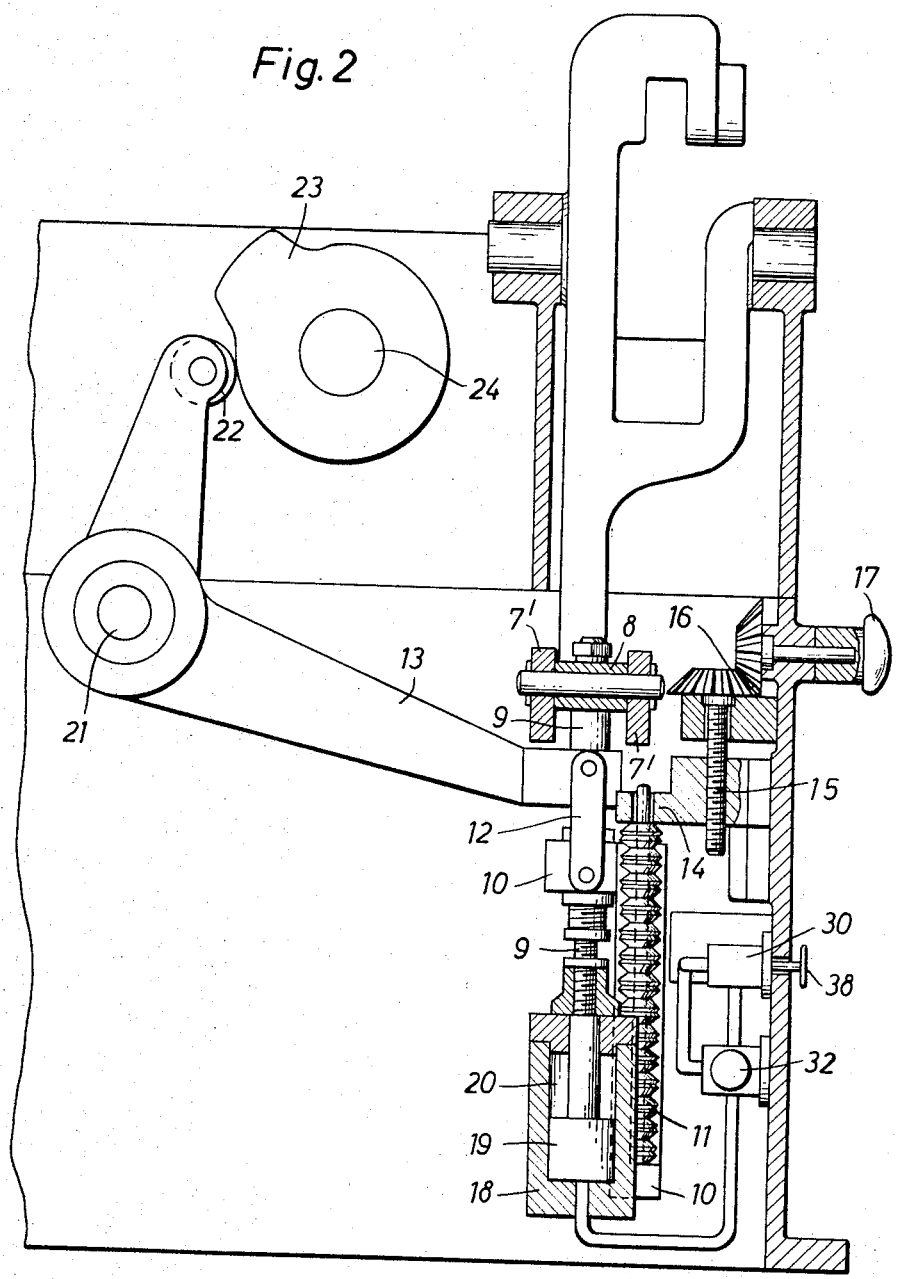
FIGURE 2 is a side view, partly in section of the same machine.

FIGURE 1 shows a chain element 1 having ends 1' and 1" which are to be welded together. The chain element 1 is located upon a welding saddle 2 and is pressed from opposite sides by upsetting dies 3 and 3'. The dies 3 and 3' are carried by the short arms 4 and 4', respectively, of two-armed upsetting levers 6 and 6' which are mounted upon axles 5 and 5'. The long arms of the levers 6 and 6' carry toggle joints 7 and 7', respectively. The toggle joints 7 and 7' are connected with a bridge 8 which is connected with a pull bolt 9. The bolt 9 is firmly connected with a spring carrier 10 supporting pressure spring packages 11 and 11'. As best shown in FIG. 2, a welding lever 13 is connected with the spring carrier 10 by links 12. A counter support 14 is provided for the springs. The counter support 14 can be adjusted by means of a threaded spindle 15 extending therethrough and actuated through a pair of meshing cone gears 16 by a hand wheel 17, so that the force of the springs 11 and 11' and thus the upsetting force, can be conveniently varied.

In accordance with the present invention the springs 11 and 11' act in the opposite direction to that of the hydraulic pressure cylinder 18 which is fixed and the piston 19 of which is connected with the bolt 9. Since the bolt 9 is firmly connected with the spring carrier 10, the tensioned springs 11 and 11' will press the bolt 9 downwardly; this pressure is opposed by the pressure in the pressure chamber 20 of the cylinder 18. The tensioning position of the springs 11 and 11' and the initial position of the piston 19 are set by the welding lever 13 which is swingable about an axle 21 and which carries a roller 22 engaging a cam 23 driven by a steering shaft 24. Thus the lever 23 is actuated by the cam 23.

Figure 3:
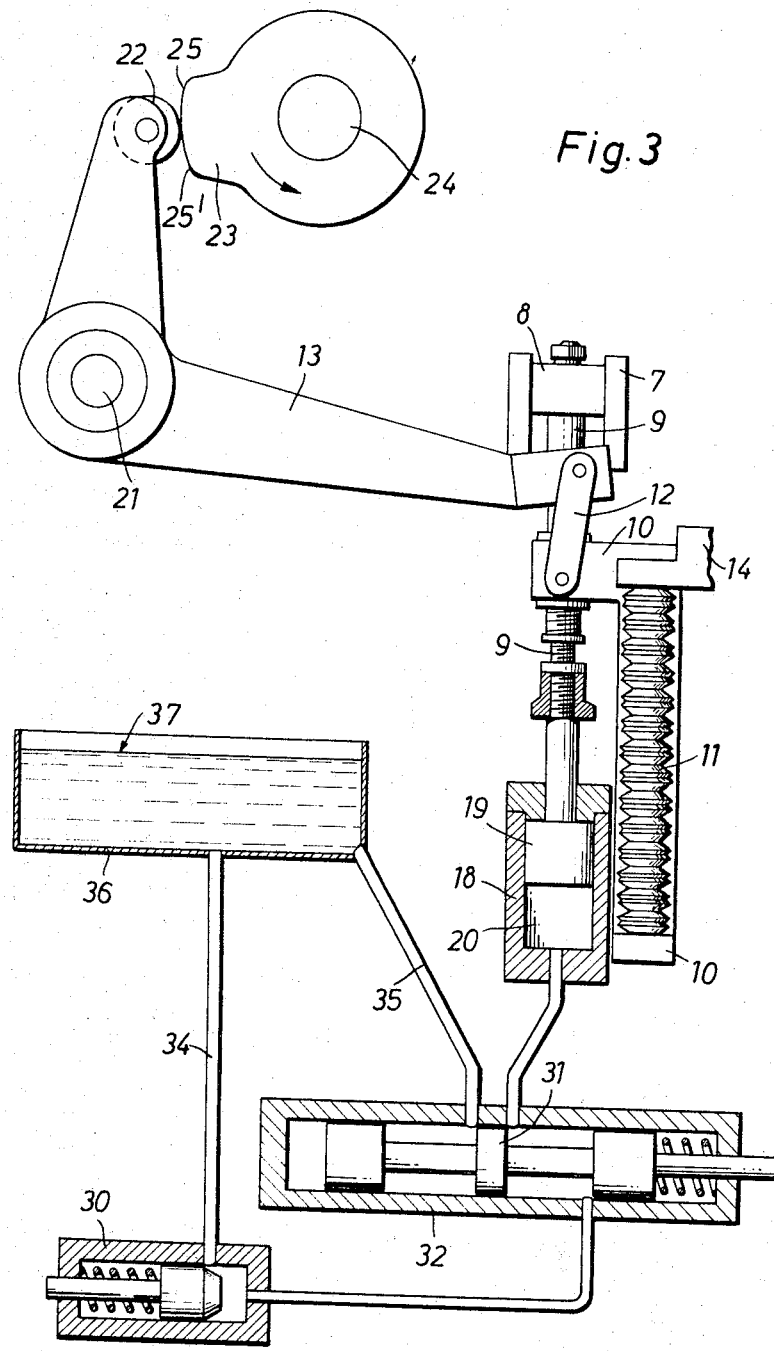
FIGURE 3 is a diagrammatic illustration of the entire machine, partly in side view and partly in section.

The operation of the welding machine of the present invention, as best illustrated in FIG. 3, is as follows:

The unwelded chain element 1 is placed upon the welding saddle 2 by a device not shown in the drawings. At that time the roller 22 of the lever 13 is between the locations 25 and 25' of the cam 23. In this position of the cam 23 the springs 11 and 11' are tensioned and the piston 19 of the hydraulic cylinder 18 is in its uppermost position. During this operational period the dies 3 and 3' are so spaced from each other than the chain element 1 to be welded can be easily placed between the dies.

As soon as the cam 23 releases the lever 13, the force of the tensioned springs 11 and 11' will move downwardly the spring carrier 10, the bolt 9 and the bridge 8, so that the long arms of the levers 6 and 6' will be moved outwardly by the toggle joints 7 and 7'; the short arms and thus the dies 3 and 3' will move toward each other. On the other hand, the piston 19 will be moved in the pressure chamber 20 of the hydraulic cylinder 18 against the pressure prevailing in the chamber. Thus a force will be exerted upon the bolt 9 which consists of the difference between the force of the springs and the counter force exerted by the piston 19.

During the preliminary heating of the ends of the chain element to be welded, this counter force is determined by a maximum pressure regulator 30 which maintains the pressure in the pressure chamber 20 of the hydraulic cylinder 18 at a constant value.

By way of example, if it be assumed that the force of springs exerted upon the bolt 9 amounts to 300 kg. and if the mamimum pressure is so set by the maximum pressure regulator 30 that the piston 19 exerts a counter force of 200 kg., then the bolt 9 pulls the bridge 8 with a force of 300 kg.—200 kg.=100 kg., so that the upsetting dies exert during this work phase a positioning pressure upon the chain element to be welded. During this preliminary heating period and electrical current is supplied to the ends of the chain element in a known manner through electrodes (not shown) so as to heat them to the welding temperature.

When the chain element ends reach the welding temperature, an actuating device known per se opens a closing device (to be described in detail hereinafter), which causes a suddent drop in pressure in the pressure chamber 20 of the cylinder 18. Then the full spring force, amounting to 300 kg. in the given example, will act upon the bridge 8.

In the embodiment shown in FIG. 3, the drop in pressure in the hydraulic pressure cylinder 18 is produced by an electromagnetically operated three way slide 32 provided with a closing member 31, and connected by a pipe with the cylinder 18. During the pre-heating period the operative surfaces of the slide member are so located that the pressure chamber 20 in the cylinder 18 is connected only with the adjustable maximum pressure regulator 30 which is connected by another pipe with the slide. When the ends of the chain element have been heated to the welding temperature, the slide is moved to another position by a device which is known per se and which may consist of means responsive to light or heat radiation, or, for example, of means operable after a certain time period, or at the end of the upsetting path during the preliminary heating, or when the welding current reaches a certain value; in this other position of the slide the pressure chamber 20 is connected with an opening of comparatively large cross-section, so that its pressure drops to about atmospheric pressure. Then the entire upsetting pressure becomes effective.

A pipe 34 is connected with the pressure regulator 30, while a pipe 35 is connected to the slide 32. The pipes 34 and 35 are connected with a container 36 filled with oil the level 37 of which is higher than the other parts of this hydraulic apparatus.

After the welding of one chain element has been completed, the following chain element is placed upon the saddle 2; the cam 23 of the shaft 24 raises the lever 13 so that the springs 11 and 11' are tensioned and the piston 19 of the hydraulic cylinder 18 is moved back to its initial position. During this operation oil in the container 36 is drawn through the pipe 35 into the slide and thence into the pressure chamber 20, since the member 31 is in an open position. When the piston 19 reaches its upper position, it operates a switch (not shown) which actuates the magnetic slide 32 so that is member 31 moves back to the position shown in FIG. 3. Then the cycle of operations can begin again.

As shown in FIG. 2, the maximum pressure regulator 30 is so located in the machine, that the maximum pressure can be conveniently adjusted by a hand wheel 38. A scale (not shown) is used to indicate the set counter pressure.

It is apparent from the above description that in accordance with an important feature of the present invention a spring device operates upon the bridge 8, the spring force of which corresponds to the upsetting pressure.

On the other hand in prior art devices the spring force corresponded only to the positioning pressure.

In accordance with the present invention, during the first operational phase, during which only the positioning pressure must exist, a force is opposed to the high spring force.

On the other hand, in prior art constructions during the second phase of movements an additional force is added to the comparatively weak positioning force of the springs to attain the upsetting pressure.

Thus an advantage of the present invention consists essentially in that the opposing force is effective from the beginning of the operation and during the first operational phase, whereupon at the beginning of the second operational phase it suddenly drops to zero, so that the entire upsetting force becomes effective.

Prior art devices do not operate with a difference between two forces, but with the sum of two forces so that play between the positioning force and the additional force is unavoidable, with the result that shocks are produced. These shocks or impacts differ depending upon the type and size of the chain element and upon the differences in the prevailing welding procedures, so that prior art machines do not operate quietly and are mechanically highly affected by the impacts.

On the other hand, the machine of the present invention operates without impacts, although it does operate with a jolt, so that the change from a positioning force to an upsetting force is effected in a very short time period, since is is not necessary to bridge over a play.

A further important feature of the present invention consists in that it follows practical experience which has shown that the upsetting force should be introduced suddenly, i.e. the differential pressure should be suddenly eliminated. This requires that the lengths of the conduits should be such that there are no flow losses.

The auxiliary hydraulic apparatus of the present invention is subjected to the regulating pressure of the maximum pressure regulator 30, i.e, it is subjected to the pressure of its springs. They as counter-springs constitute the actual effective additional force, while the hydraulic means serve for the transmission of forces; they can be replaced by a mechanical force-transmitting device. However, the hydraulic means of the present invention have the addtional advantage that pressure in the hydraulic apparatus always remains completely uniform, since the springs do not carry out a stroke. If the hydraulic cylinder 18 with its piston 19 and chamber 20 were replaced by a mechanical spring device, such device would be dependent upon the stroke and thus upon the characteristic features of the springs.

It is apparent that the example described above has been given solely by way of illustration and not by way of limitation and that it is subject to many variations and modifications within the scope of the present invention. All such variations and modifications are to be included within the scope of the present invention.

What is claimed is:

An apparatus for welding a chain element, comprising, in combination, opposed upsetting dies adapted to press against opposite sides of a chain element located therebetween first with a smaller pressure and then with a greater upsetting pressure, a pair of two-armed levers having arms carrying said dies, toggle joints connected with the other arms of said two-armed levers, springs, means connecting said springs with said toggle joints, means adjusting the tension of said springs, whereby said springs transmit to said dies said upsetting pressure, a hydraulic cylinder adapted to exert pressure, means connecting said hydraulic cylinder with the first-mentioned means for transmitting to the first-mentioned means the hydraulic cylinder pressure in a direction opposite to that of the upsetting pressure transmitted by the first-mentioned means, a swingable two-armed welding lever, means connecting one arm of said welding lever with the first-mentioned means, and a cam engaging the other end of said welding lever for varying the position of said welding lever.

References Cited
UNITED STATES PATENTS

| | | | |
|---|---|---|---|
| 2,288,494 | 6/1943 | Speed et al. | 219—51 |
| 2,500,876 | 3/1950 | Seeloff | 219—89 |
| 2,684,422 | 7/1954 | Esser et al. | 219—51 |
| 2,731,534 | 1/1956 | Hansen et al. | 219—89 |
| 3,024,347 | 3/1962 | Esser | 219—52 |

RICHARD M. WOOD, *Primary Examiner.*

B. A. STEIN, *Assistant Examiner.*